United States Patent [19]

Finkler et al.

[11] Patent Number: 5,351,306
[45] Date of Patent: Sep. 27, 1994

[54] APPARATUS FOR REPRODUCING VIDEO SIGNALS ON A MONITOR

[75] Inventors: Klaus Finkler, Erlangen; Volker Heer, Bamberg, both of Fed. Rep. of Germany

[73] Assignee: Siemens Aktiengesellschaft, Munich, Fed. Rep. of Germany

[21] Appl. No.: 938,605

[22] Filed: Sep. 1, 1992

[30] Foreign Application Priority Data

Sep. 6, 1991 [DE] Fed. Rep. of Germany ....... 4129656

[51] Int. Cl.$^5$ .............................................. G06K 9/00
[52] U.S. Cl. .................................. 382/6; 364/413.22; 382/50; 382/54
[58] Field of Search .................... 382/6, 54, 50, 51, 52, 382/53; 364/413.13, 413.22

[56] References Cited

U.S. PATENT DOCUMENTS

| 4,827,492 | 5/1989 | Klauzs | 382/6 |
| 4,833,625 | 5/1989 | Fisher et al. | 364/518 |
| 4,906,310 | 2/1990 | Takeo et al. | 382/6 |
| 5,046,118 | 9/1991 | Ajewole et al. | 382/51 |
| 5,065,436 | 11/1991 | Matsumura | 382/6 |
| 5,067,163 | 11/1991 | Adachi | 382/50 |
| 5,150,421 | 9/1992 | Morishita et al. | 382/51 |
| 5,164,993 | 11/1992 | Capozzi et al. | 382/6 |
| 5,170,443 | 12/1992 | Todd | 382/6 |
| 5,172,419 | 12/1992 | Manian | 382/6 |
| 5,179,597 | 1/1993 | Takeo | 382/51 |
| 5,228,099 | 7/1993 | Yamada | 382/51 |
| 5,265,200 | 11/1993 | Edgar | 382/51 |

Primary Examiner—Joseph Mancuso
Attorney, Agent, or Firm—Hill, Steadman & Simpson

[57] ABSTRACT

An apparatus for the reproduction of video signals on a monitor has a circuit connected with the monitor for the conversion of grayscale values of a video signal. The apparatus has a computing unit connected to the conversion circuit which, on the basis of a statistical evaluation of the grayscale distribution, recalculates the standard used for the conversion of the grayscale values so that in the display of an image on the monitor the dynamic range within a region of interest is completely utilized. The conversion circuit is supplied with the calculated, corrected values for the conversion from the calculating unit.

9 Claims, 4 Drawing Sheets

APPARATUS FOR REPRODUCING VIDEO SIGNALS ON A MONITOR

BACKGROUND OF THE INVENTION

1. Field of the Invention

The present invention relates to an apparatus for the reproduction of video signals on a monitor, having a circuit connected to the monitor for the transformation of grayscale values of a video signal.

2. Description of the Prior Art

Reproduction systems of the type described above can be used, for example, in x-ray diagnostic arrangements that have an image transformer for the conversion of an x-ray image into an electric signal sequence, such as a video signal. Such an image transformer can be, for example, a television camera or a storage foil.

These analog video signals are in general converted in an analog/digital converter (A/D-converter) into digital values so that the x-ray image is resolved into different image points (pixels), to which different digital grayscale values are allocated. In a reproduction device the digital video signal can be processed and, through a digital/analog converter (D/A-converter) be displayed on a monitor as a visible picture.

In order to obtain a contrast-rich image on the monitor over the entire image range that contains diagnostically relevant information, the D/A converter should be offered, in the image region of interest, the entire range of the grayscale values, i.e., a full dynamic should be utilized. This condition, however, is normally not fulfilled, since, for example, the image converter is controlled independently of the grayscale values, so that the dynamic range of the A/D converter cannot be optimally utilized.

Further, in x-ray diagnostics lead plates are ordinarily used to blank outer regions of the image, so that the darkest images regions lie outside the image region of interest. In x-ray exposures, for example, of the skull or of the extremities blooming can occur in the image region of interest because the completely dark image regions were used as the basis for the low end of the grayscale allocation. The results in image areas of maximal brightness which carry no diagnostic information data.

In order to achieve an optimum grayscale value image presentation, it is known to amplify or "window" all the pixels of the video signal, before they are conducted to the D/A converter, in such a way that the grayscale value zone of interest is spread onto the full brightness range of the image monitor. Grayscale values of the video signal that lie outside of this window, however, are still represented only as black or white on the image monitor.

In U.S. Pat. No. 4,827,492 a window system is described in which two operating elements are provided for the adjustment of the window. In this known system, one operating element sets the window width and another sets the window middle, or the upper or lower window boundary. What is disadvantageous here is that a complicated adjustment has to be undertaken, in which the two operating elements are alternatingly manipulated for an optimum of the image. Reproducible picture results, however, are achievable only with difficulty. Reproducible results, however, are required, especially for a hardcopy documentation for which the image quality must be kept constant, for example, on a film.

SUMMARY OF THE INVENTION

It is an object of the present invention to provide an apparatus for the reproduction of a video image on a monitor of the type wherein a grayscale value conversion is used in the creation of the displayed image in which an optimal grayscale value windowing is automatically undertaken thereby permitting image zones of interest as well as minimal and maximal values to be faultlessly recognized.

The above object is achieved in accordance with the principles of the present invention in a reproduction apparatus having a computing unit which is connected to the grayscale conversion circuit, the computing unit recalculating the conversion of the scale of grayscale values on the basis of a statistical evaluation of the grayscale value distribution so that, in the reproduction on the monitor, the dynamic range is completely utilized within an image region of interest. The grayscale conversion circuit is fed the calculated values for the transformation from the computing unit. With the aid of the computing unit, which has unrestricted access to the video signal, a statistical distribution of the grayscale values of the individual image points is analyzed. On the basis of this statistical evaluation the grayscale value distribution can then be undertaken anew by the conversion circuit, so that the dynamic range of the monitor, i.e., all the grayscale value gradations recognizable on the monitor, is completely utilized.

The process is most simplified if the computing unit is constructed so that the statistical evaluation occurs only in certain image regions which are selectable individually and independently of one another. In these selected image regions (ROIs) of defined number, size and position, the statistical distribution of the grayscale values can be investigated individually and independently of one another. The position and form of the image regions is chosen such that they lie either only entirely inside or entirely outside a mask.

Preferably, the computing unit is constructed so that the statistical evaluation delivers average values, standard deviations, and minimal and/or maximal values of the grayscale values. It has proved expedient for the computing unit to provide information only for those of the selected regions in which the statistics evaluation delivers a value exceeding a threshold. This insures that only those image regions are used for further evaluation whose average values and standard deviations exceed certain predetermined or automatically determined thresholds. A region having such parameters below these thresholds is assumed that this to lie in a masked area, and thus it is not used for the further evaluation. From the remaining image regions a minimal and a maximal value are obtained in each case. The smallest minimal value and the largest maximal value among all regions then the absolute minimal and maximal values, from which the parameters for the grayscale value transformation are determined.

Pixel errors or other image errors are not recognized as extreme values if the computing unit is constructed so that it integrates the minimal and maximal values. This integration can advantageously occur if the computing unit is constructed so that it generates a histogram.

It has proven advantageous for the video signal to be fed to an image memory which is connected to the computing unit, with the image memory and the computing unit being connected through a switching device to a look-up table, which is used for the conversion of the video signal and is connected to the monitor for the reproduction of the transformed video signal. The computing unit is also directly connected to the look-up table, so that a correction of the values for the conversion stored in the look-up table is made the basis of the statistical evaluation.

DESCRIPTION OF THE PREFERRED EMBODIMENTS

Figure 1:
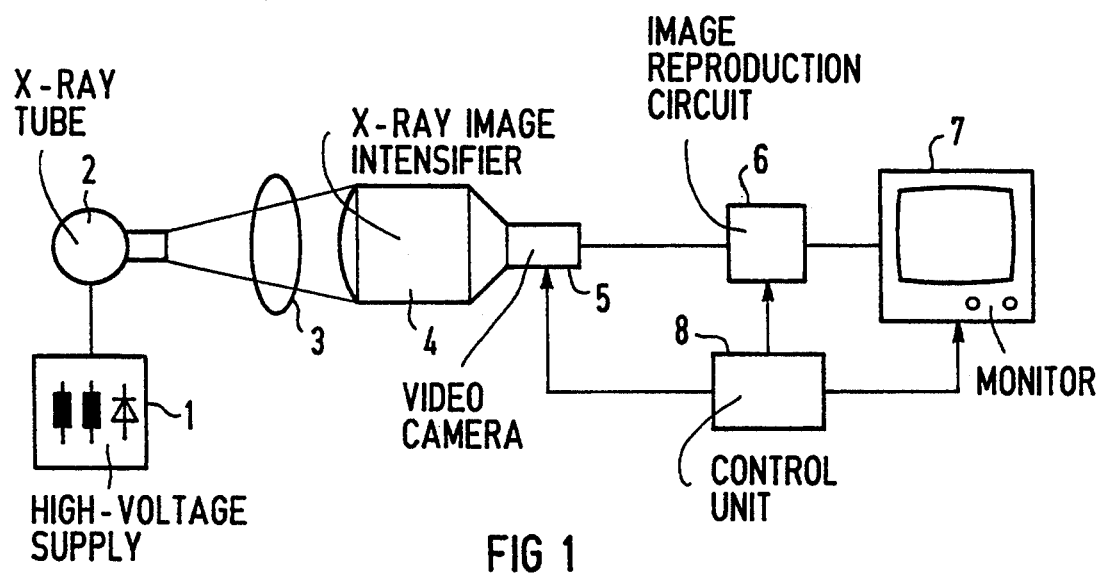
FIG. 1 is a schematic block diagram of a conventional a-ray diagnostic arrangement, according to the state of the art.

A conventional x-ray diagnostics system is shown in FIG. 1 which includes an x-ray tube 2 driven by a high-voltage generator 1. The tube 2 generates an x-ray beam which penetrates a patient 3. By virtue of the different attenuation coefficients of the tissue and bones of the patient 3, a radiation image is generated which falls upon the input luminescent screen of an x-ray image intensifier 4. The x-ray image intensifier 4 produces on its output luminescent screen a visible image reduced in size and amplified in its intensity. A video camera 5 generates video signals corresponding to this output image, which are fed to a reproduction circuit 6, which undertakes, for example, a windowing of-the video signals delivered from the video camera 5. The output signals of the reproduction circuit 6 are displayed on a monitor 7. A control circuit 8 generates control signals for synchronizing the operation of components 5, 6, and 7.

Figure 2:
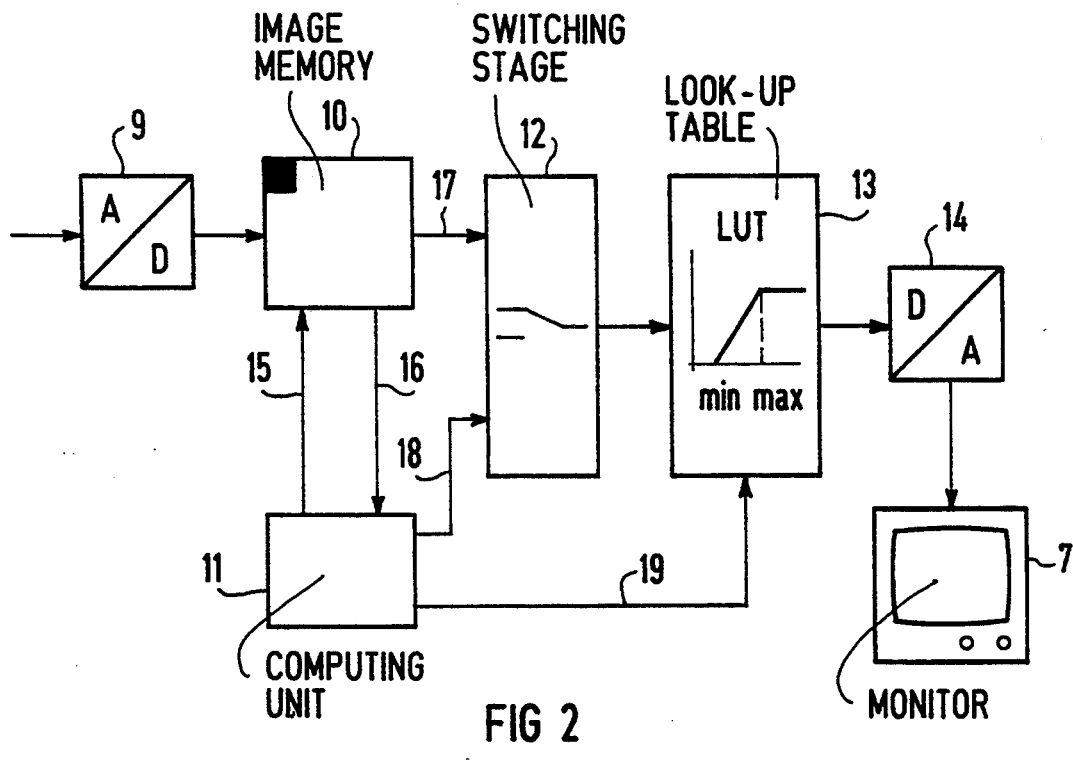
FIG. 2 is a schematic block diagram of an image reproduction apparatus constructed in accordance with the principles of the present invention, which can be used in the arrangement represented in FIG. 1.

A reproduction circuit 6 according to the invention is shown in FIG. 2. The output signal of the video camera 5 is fed to an A/D-converter 9, the digital output signal of which is entered pixel-by-pixel in an image memory 10. A computing unit 11 is connected to the image memory 10, which statistically evaluates the data contained in the image memory 10. For this purpose the computing unit 11 calls via, an address line 15, data from storage locations determined by the computing unit 11, allocated to the pixels. A switching stage 12 is connected to the image memory 10 and the computing unit 11, via a data line 17 and an address line 18. The switching device 12, connects either the image memory 10 or the computing unit 11 to the address input of a circuit for the conversion of grayscale values of the video signal, for example a look-up table 13. The data input of the look-up table 13 is connected via a data line 19, to the computing unit 11. The data output of the look-up table 13 is connected to a D/A converter 14, which is connected to the monitor 7 for the display of the analog, converted video signal.

Figure 3:
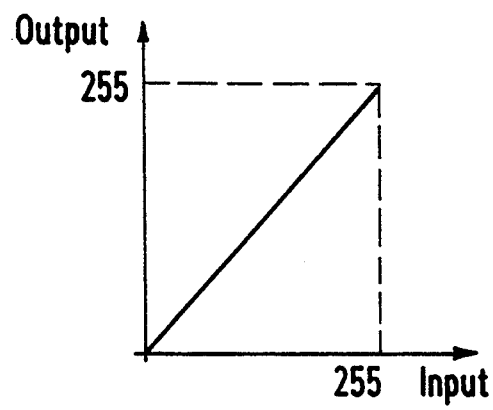
FIGS. 3 to 5 respectively show characteristic curves of the grayscale value conversion of the reproduction apparatus according to the invention for assisting in the explanation of the invention.
Figure 4:
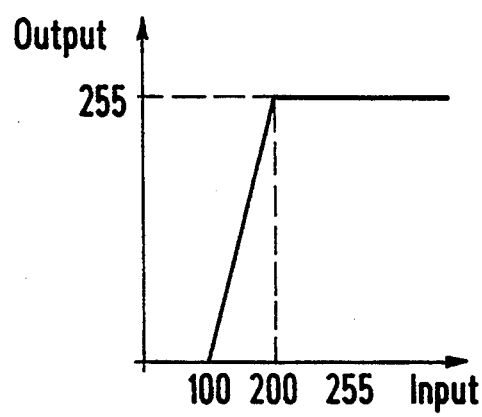
Figure 5:
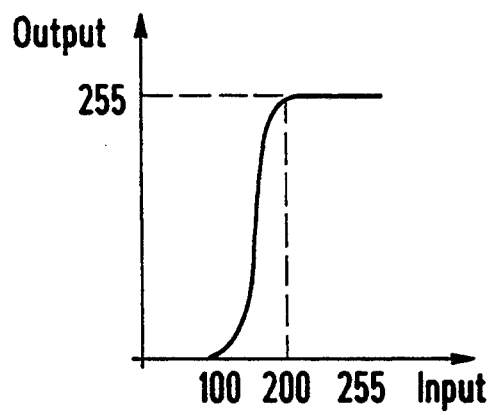

The functioning of the look-up table 13 is explained with the aid of FIGS. 3 to 5. As an example it is assumed that the digital grayscale values have a depth of 8 bits, so that each pixel yields grayscale values between 0 and 255. These can now be reproduced linearly, as is represented in FIG. 3. To each of the input values 0 to 255 there is allocated the same output value 0 to 255. This means that in the look-up table 13 there is stored a straight line. As already mentioned, however, such a linearity is not always desired, since in the image region of interest it is possible this dynamic in grayscale values between 0 and 255 is not present.

Again as an example it is assumed that in the image region of interest the gray values take on a value between 100 and 200, as is represented in FIG. 4. If one wants to bring about a linear conversion of the grayscale values in the image region, the straight line shown in FIG. 4 is obtained, in which the input values below 100 represent the value 0 and the input values over 200 represent output values of 255. Within the input value range from 100 to 200 there lies the straight line which brings about an allocation of the input values to the output values of 0 to 255.

Instead of a linear distribution within the region of interest, a distribution can be used with several straight lines of respectively different slopes, or an S-shaped characteristic curve represented in FIG. 5. Again, to the range of input values between 100 and 200 there are allocated the output values 0 to 255. In the border zone of the output signal toward the black or white value this curve has a relatively flat slope, while in the middle zone it has a steep slope, so that in this range the contrasts are especially reinforced.

Such characteristic curves can now be stored in the look-up table 13. If this characteristic curve, however, should not be optimal then under the control of the computing unit 11, these values can be corrected. This is achieved by the computing unit 11 having unrestricted access into the image memory 10, so that certain image regions (ROIs) can be examined in defined number, size and position individually and independently of one another as to the statistical distribution of their grayscale values. The position and shape of the image regions is chosen in such a way that they can lie either only entirely within or entirely outside of an inlaid masking or an overlaid masking. The statistical evaluation yields, for each individual image region the average value, the standard deviation, and the minimal and maximal values of the grayscale value distribution.

For further evaluation only the image regions are used having respective average values and standard deviations which exceed threshold values, which can either be previously established or can be automatically determined. Regions having such parameters below these threshold values are to lie inside a masking, since a large absorption generates a low average value and a homogeneous structure generates a low standard deviation. An image region recognized in this manner is not taken into account for the further evaluation. From the other image regions, a minimal and a maximal value are obtained in each case. The smallest minimal value and the largest maximal value of all the regions are then used as the absolute minimal value and absolute maximal value from which the parameters for the grayscale value conversion can be determined.

Figure 6:
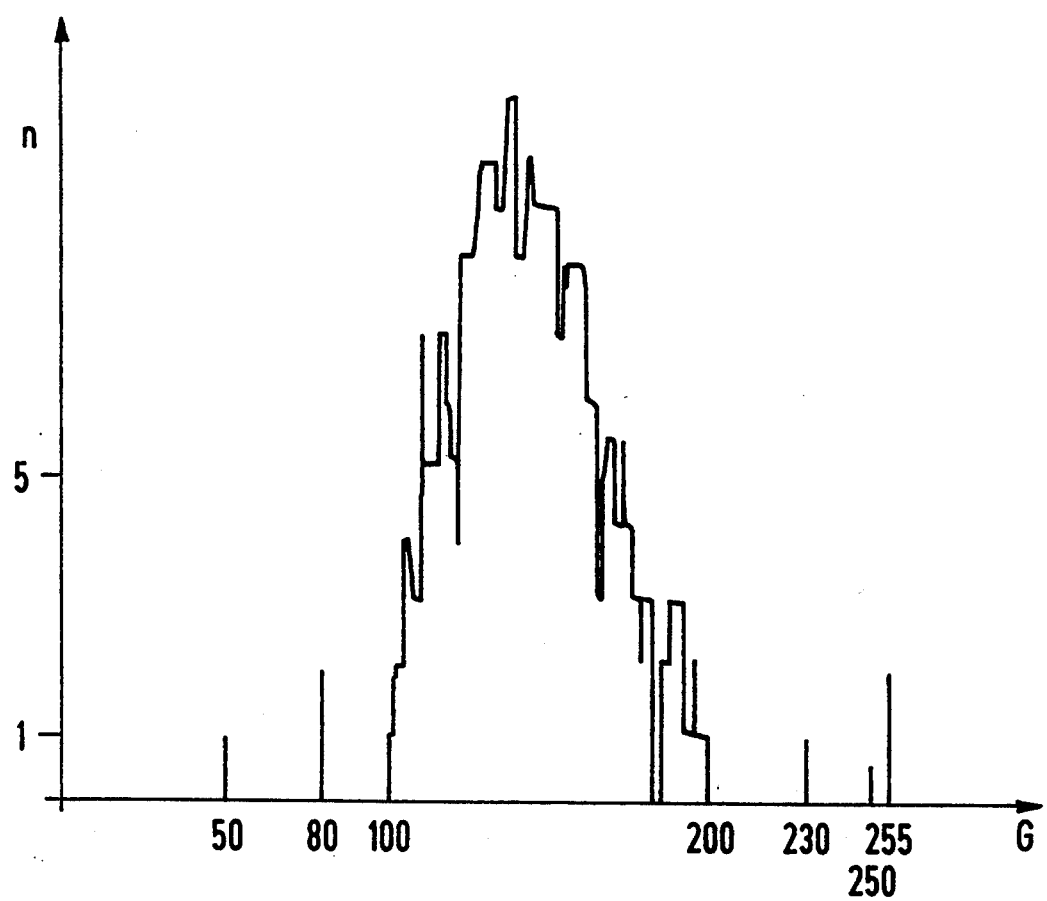
FIG. 6 shows a histogram for the determination of the integral minimal and maximal values in accordance with the invention.

In order to avoid identifying pixel errors or other errors as extreme values, the maximal and minimal values are not determined absolutely in the statistical evaluation of the grayscale values, but are instead determined by integrations. Accordingly, for the grayscale values of an image region, a histogram, which is represented as an example in FIG. 6, is generated by the computing unit 11. Thus the frequency n of the individual grayscale values G is obtained. In order to obtain the integral minimal value, the computing unit 11 starts a cumulative summation in the histogram, beginning with the grayscale value G=0, of the frequency n, over increasing grayscale values. The grayscale value G at which the sum exceeds a certain threshold is assumed as integral minimal value. An analogous procedure is followed in the determination of the integral maximal value. The summation is started at the grayscale value G of 255 and an integration is carried out toward lower grayscale values G. In this way it is possible to exclude pixel errors which are presented, for example, at the grayscale values, 50, 80, 230, 250 and 255, or other image errors that should not be taken into account in the evaluation, since their frequency of occurrence is generally very low.

The extreme values thus determined serve as limit values for the grayscale value transformation and can be converted into an average value and a width of the resulting grayscale value window. From the above described histograms, the optimal functional shape of the curve can be determined for an S-shaped conversion. This lies, in the example given, between 100 and 200, so that the curve represented in FIG. 5 can be used.

For this purpose after the determination of the histogram and of the minimal and maximal values by the computing unit 11, the values determined by the computing unit 11 for the S-shaped curve are fed to the look-up table 13 via the data line 19. The switching device 12 is switched so that, through the address line 18, the correct allocation of the individual data is assured. Thereupon the switching device 12 is again switched, so that the image memory 10 is connected via the data line 17 to the look-up table 13. The digital video signal contained in the image memory 10 is then read out, converted by the look-up table 13 and, through the D/A converter 14, displayed on the monitor 7 with optimal grayscale value windowing, so that the ROIs are reproduced with optimal contrast.

Instead of a single computing unit 11 which undertakes the individual statistical evaluations successively, different circuits can be produced which determine separately and in parallel, the mean values, standard deviations, and minimal and/or maximal values of the grayscale values. Also, the histogram evaluation can be done by a separate circuit. The suppression of the image regions lying below a threshold can be accomplished by a threshold value circuit in the computing unit 11.

Figure 7:
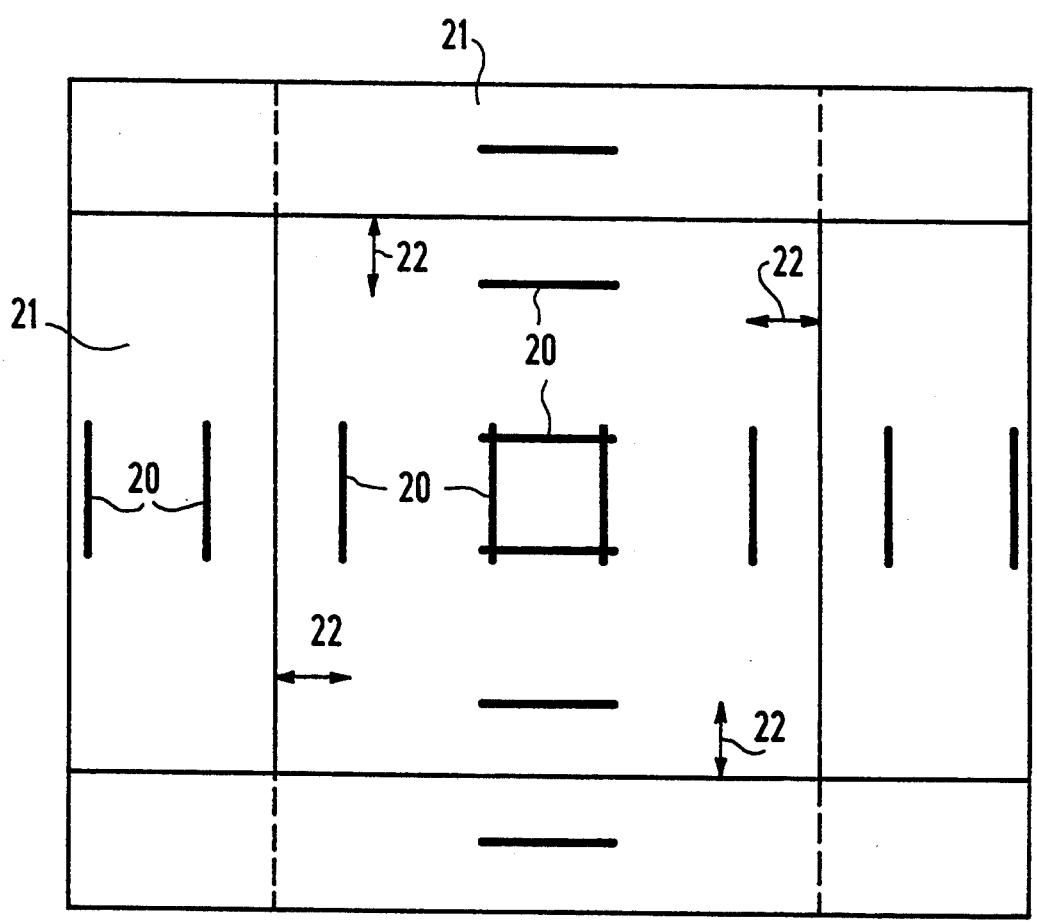
FIG. 7 shows the position of the image regions of interest (ROI) in a display field in accordance with the invention.

In FIG. 7 the position and shape of the image regions of interest (ROIs) are represented. For the selection of the ROIs, a rectilinearly arranged set of markers 20 can be used for the delineating of maskings and blooming and for setting grayscale value lower limits as well as grayscale value upper limits in the image region of interest. The width of these markers 20 should not be greater than one or two pixels, in order to lie clearly in the unmasked region or in the region outside the field of view. Electronically generated maskings 21 are shiftable in the direction of the arrows 22 which can be correlated with the position of the plates of a primary beam diaphragm.

Although modifications and changes may be suggested by those skilled in the art, it is the intention of the inventors to embody within the patent warranted hereon all changes and modifications as reasonably and properly come within the scope of their contribution to the art.

We claim as our invention:

1. An apparatus for reproducing video signals on a monitor comprising:
   means for generating a video signal;
   a monitor on which an image corresponding to said video signal is to be displayed;
   conversion means for converting grayscale values associated with said video signal into imaging signals, based on a conversion standard applied to all of said grayscale values, for use in creating said image to be displayed;
   means for identifying a plurality of regions of interest having fixed locations within said image; and
   computing means for making statistical evaluations of the distribution of said grayscale values in said regions of interest in said image to be displayed to obtain a set of statistical values for each region of interest and for comparing said statistical values to a threshold, and for selecting only regions of interest having a statistical value with a designated relationship to said threshold, and for recalculating, based exclusively on said selected regions of interest, said conversion standard for completely utilizing the full dynamic range of said grayscale values within a region of interest to be displayed, said computing means being connected to said conversion means for supplying the recalculated conversion standard thereto.

2. An apparatus as claimed in claim 1 wherein said computing means includes means for selecting, for said statistical evaluation, only regions of said image to be displayed having a statistical value exceeding said threshold.

3. An apparatus as claimed in claim 2 wherein said computing means includes means for conducting an integration of said grayscale value distribution, starting from a lowest grayscale value, until said threshold is exceeded.

4. An apparatus as claimed in claim 3 wherein said means for integrating comprises:
   means for generating a histogram of said grayscale values, said histogram having said lowest grayscale value; and
   means for cumulatively summing the contents of said histogram, starting from said lowest grayscale value, until said threshold is exceeded.

5. An apparatus as claimed in claim 1 wherein said computing means includes means for selecting, for said statistical evaluation, only regions of said image to be displayed having a statistical value going below said threshold.

6. An apparatus as claimed in claim 5 wherein said computing means includes means for conducting an integration of said grayscale value distribution, starting from a highest grayscale value, until said threshold is gone below.

7. An apparatus as claimed in claim 6 wherein said means for integrating comprises:

means for generating a histogram of said grayscale values, said histogram having said highest grayscale value; and means for cumulatively summing the contents of said histogram, starting from said highest grayscale value, until said threshold is gone below.

8. An apparatus as claimed in claim 1 wherein said conversion means is a look-up table containing look-up table values, and said apparatus further comprising:

an image memory in which said video signals are stored pixel-by-pixel; and switching means for alternatively connecting one of said image memory or said computing means to said look-up table, said computing means, when connected to said look-up table, correcting said look-up table values on the basis of said statistical evaluation for use in converting said video signal when said image memory is connected to said look-up table.

9. An apparatus as claimed in claim 1 wherein said computing means includes means for generating a histogram of said grey scale values to form said statistical evaluation for recalculating said conversion standard.

* * * * *